United States Patent
Harikumar et al.

(10) Patent No.: US 10,021,207 B1
(45) Date of Patent: Jul. 10, 2018

(54) ARCHITECTURE FOR PROACTIVELY PROVIDING BUNDLED CONTENT ITEMS TO CLIENT DEVICES

(71) Applicant: Amazon Technologies, Inc., Reno, NV (US)

(72) Inventors: Gopal Harikumar, Fremont, CA (US); Sajeeva Lakmal Bandara Pallemulle, Woodinville, WA (US); Ameet Nirmal Vaswani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 458 days.

(21) Appl. No.: 14/222,360

(22) Filed: Mar. 21, 2014

(51) Int. Cl.
| G06F 17/00 | (2006.01) |
| G06F 17/30 | (2006.01) |
| G06F 7/00 | (2006.01) |
| G06N 5/04 | (2006.01) |
| H04L 29/06 | (2006.01) |
| H04L 29/08 | (2006.01) |

(52) U.S. Cl.
CPC .... H04L 67/2833 (2013.01); G06F 17/30902 (2013.01); G06F 17/30905 (2013.01); H04L 67/02 (2013.01); H04L 67/10 (2013.01); H04L 67/2842 (2013.01)

(58) Field of Classification Search
CPC ............ G06F 17/30902; H04L 67/02; H04L 67/2842; H04L 67/28
See application file for complete search history.

(56) References Cited

U.S. PATENT DOCUMENTS

| 7,349,902 | B1 * | 3/2008 | Arlitt | G06F 17/30902 |
| 2006/0265355 | A1 * | 11/2006 | Taylor | G06F 17/3089 |
| 2008/0208789 | A1 * | 8/2008 | Almog | G06N 99/005 706/54 |
| 2008/0307034 | A1 * | 12/2008 | Fleet | G06Q 30/0603 709/202 |
| 2010/0268736 | A1 * | 10/2010 | Ruhlen | G06F 17/30905 707/770 |
| 2011/0295937 | A1 | 12/2011 | Howard et al. | |
| 2012/0245988 | A1 | 9/2012 | Pace et al. | |
| 2013/0226992 | A1 * | 8/2013 | Bapst | H04L 67/42 709/203 |
| 2014/0143647 | A1 * | 5/2014 | Reshadi | G06F 17/30902 715/234 |

* cited by examiner

*Primary Examiner* — Nicholas R Taylor
*Assistant Examiner* — Ho T Shiu
(74) *Attorney, Agent, or Firm* — Knobbe Martens Olson & Bear, LLP (57) ABSTRACT

Features are disclosed for generating bundles of content items and proactively providing the bundles to client devices. The bundles may be provided to client devices in response to requests for the content page that references the content items in the bundle, or in response to a request for a content page hosted by the same domain as the content items in the bundle. A browser module executing on the client device can extract the referenced content items in the bundle and cache them in a local content cache at the client device prior to the client device receiving and processing a requested content page. As a result, the browser module may have access to cached versions of referenced content items when processing the requested content page even if the referenced content items were not present when the requested content page was requested.

18 Claims, 5 Drawing Sheets

ARCHITECTURE FOR PROACTIVELY PROVIDING BUNDLED CONTENT ITEMS TO CLIENT DEVICES

BACKGROUND

Computing devices can be used to request content from other computing devices over a communication network. In a common application, a client computing device can request a web page from a server computing device via the internet. Browser application software on the client computing device typically retrieves a requested web page, processes resource identifiers embedded in the web page to generate requests for additional resources (e.g., images, style sheets, script files, etc.), and renders the content for presentation. The user experience can be defined in terms of the performance and latencies associated with obtaining and rendering the requested network content on the client computing device. Latencies and performance limitations of any of the above processes may diminish the user experience.

Optimizations and other improvements may be implemented to reduce latency and otherwise improve the user experience. For example, proxy servers may be used to cache frequently accessed content items for multiple clients. Requests for such content items can be serviced from the proxy server's cache, rather than requiring retrieval of the content from an origin content server. As another example, content items may be cached locally at a client device, and future requests for the content items can be fulfilled from the local cache. Retrieving items from a local cache can be substantially faster than retrieving items from an origin server or a proxy server.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to an architecture in which content items referenced by or related to a requested content item may be proactively provided to a client device before the client device requests the referenced content items. More specifically, the present disclosure involves computer processes for selecting, for particular content items (e.g., content pages, such as HTML pages) or domains, referenced and/or related content items (e.g., images, style sheets, script files) that are unlikely to change over time. The referenced or related content items can be obtained and bundled by a server system in an asynchronous or background process, without receiving a request from a client device for the particular content item or domain. In response to a subsequent client request for the content item or domain, the bundle of referenced or related content items can be transmitted to the client device in addition to, and in some cases prior to or in parallel with, transmission of the requested content item.

Conventionally, proxy servers serve content from a shared proxy cache or proceed to obtain the content from a content server if it is not present in the proxy cache. However, caching at the proxy server has a relatively minor effect on page load times compared to caching at the client device. This is because each content item is downloaded individually, and some content items reference dozens or hundreds of additional content items to be downloaded. There is considerable signaling overhead associated with retrieval of each referenced content item, including at least one round-trip network communication to the server and back. Content requests made using Hypertext Transfer Protocol (HTTP) connections generally require serial retrieval (e.g., a request must be completely fulfilled before a subsequent request can be made over the connection). A client device may make multiple HTTP requests in parallel only if multiple HTTP connections are established. Establishment of each connection typically requires a handshake procedure between the client and server that can add to overall latency due to the additional round trips involved.

Some aspects of the present disclosure relate to an intermediary system that proactively provides bundles of content items referenced by or related to a requested content item (or content items referenced by various content items in a particular domain). By providing a bundle of content items referenced by and/or related to a requested content item, the intermediary system can reduce number of round-trip network communications required to provide all referenced content items to a client. Advantageously, the number of round-trip network communications may be reduced even if the client has never requested the content item referencing the content items in the bundle, and even if the referenced content items are not in the local client cache at the time the client device initiates the request for the content item referencing them. As a result, the overall user-perceived latency associated with a request may be reduced. In addition, by proactively providing the bundle before receiving a request from the client device for a content item within the bundle, user-perceived latency may be further reduced because the bundle can be provided while a client device is waiting to receive the base document or base file of the originally requested content item. Illustratively, the base document or base file may be a specifically requested HTML document that references the bundled content items, the default HTML document associated with a URL such as "index.html," a stream of dynamically-generated HTML responsive to a request for a URL, etc. When the client device receives and parses the HTML page, the local client cache may already be populated with the referenced content items, eliminating the need for any further round-trip communications for those items.

Additional aspects of the present disclosure relate to methods of selecting the content items to be included in a particular bundle, and then generating the bundle. For example, a server system, such as a proxy or some other intermediary system, may "crawl" popular content items to determine which additional content items are referenced and will therefore be requested in connection with the popular content items. Items that are cacheable (e.g., include a cache header) may be included in the bundle. Other items, such as items with no cache header, may also be included in the bundle if the intermediary system determines that the items are static or do not change for long periods of time. The determination may be made based on comparison of multiple (e.g., two or more) versions of a referenced content item accessed at different times.

As used herein, the term "bundle" refers to a single data object or container file, such as an archive or cabinet file, that includes multiple individual files corresponding to individual content items. In some embodiments, the bundle may be constructed such that a client device in the process of receiving the bundle may extract individual content items from the bundle prior to receiving the entire bundle. In some embodiments, the bundle may include a manifest or index that indicates which content items are included in the bundle. Such a manifest may be useful when the client device has received a requested HTML page and is in the process of requesting content items referenced by the HTML page. If a referenced content item is in a portion of the bundle that has not yet been received, the client device should not request the content item from the intermediary system or content server because the content item will be received without such a request. Although the examples described below focus, purposes of illustration, on bundles of referenced content item, other content items may be included in the bundles. For example, content items related to a requested content item but not referenced by the requested content item may be included in the bundle. Thus, a browser may request a home page of a particular content site, and in response, the browser can be provided a bundle that contains (possibly among other items) content items of other frequently-accessed pages of the site, or content items of pages that are accessible from the home page.

Further aspects of the present disclosure relate to personalized or customized bundles that may include content items referenced by two or more separate content items at particular domain, or by content items at multiple domains. For example, a user-specific bundle may be created that includes content items referenced by the content items requested most often by a particular user. As another example, a user-specific bundle may be created for a particular content item or domain that includes content items personalized for the user, such as images that are displayed after a user "logs in" to a domain or if a cookie identifies a particular user to the domain. The intermediary system may proactively crawl web sites using cookies identifying the particular user in order to obtain such personalized content items.

Although aspects of the embodiments described in the disclosure will focus, for the purpose of illustration, on an intermediary system that generates and serves content item bundles associated with content originating at a separate content server, one skilled in the art will appreciate that the techniques disclosed herein may be applied to any number of services, processes, or applications. For example, an original content server may generate a bundle of cacheable content items and proactively transmit the bundle to clients visiting the content server for the first time in order to pre-populate the client cache and improve the user experience with content served by that particular content server. Various aspects of the disclosure will now be described with regard to certain examples and embodiments, which are intended to illustrate but not limit the disclosure.

Networked Content Delivery Environment

Figure 1:
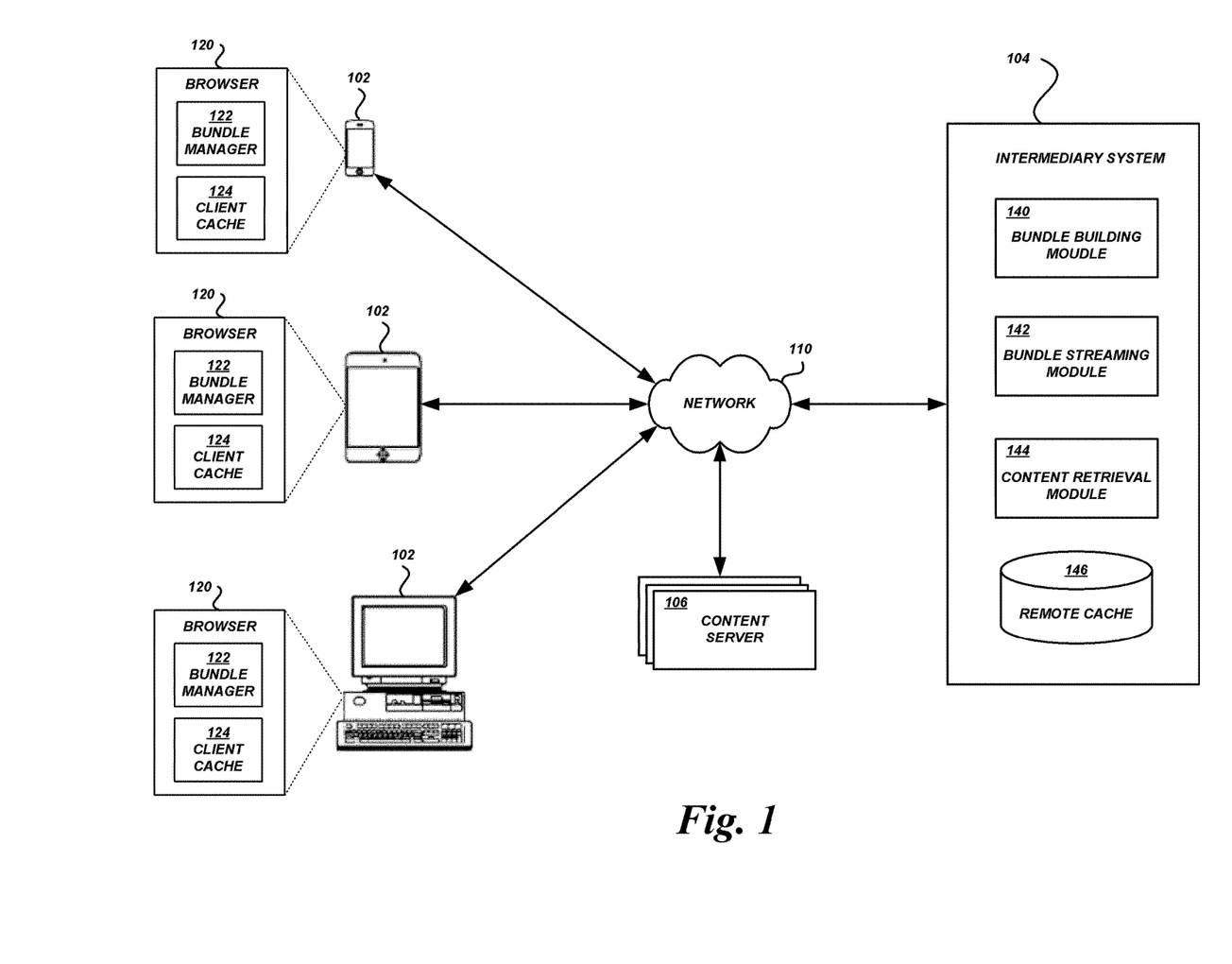
FIG. 1 is a block diagram of an illustrative network computing environment including an intermediary system, multiple content servers, and multiple client devices.

FIG. 1 illustrates an example content delivery environment in which features can be implemented for bundling referenced content items and proactively providing the bundles to client devices. The content delivery environment shown in FIG. 1 includes several different client devices 102, an intermediary system 104, and multiple content servers 106. The various systems may communicate with each other via a communication network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, a networked content delivery environment may include any number of distinct client devices 102 and/or content servers 106. In addition, multiple (e.g., two or more) intermediary systems 104 may be used. For example, separate intermediary systems 104 may be located so that they are close (in either a geographical or networking sense) to groups of current or potential client devices 102 or content servers 106. In such a configuration, a client device 102 may request content via the intermediary system 104 to which it is closest, rather than all client devices 102 requesting content via a single intermediary system 104.

The client devices 102 can include a wide variety of user computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. A client device 102 may be configured with a browser application 120 to communicate via the network 110 with other computing systems, such as the intermediary system 104 or a content server 106, and to request, receive, process, and display content. The client device 102 or browser application 120 may be associated with the intermediary system 104 or otherwise configured to exchange performance data with, and request content through, the intermediary system 104.

The browser application 120 may include a bundle manager 122 for receiving and managing bundles, and for extracting items from the bundles. The browser 120 may also have a cache 124 for storing received content items, items extracted from bundles, and in some cases the bundles themselves. In some embodiments, the bundle manager 122 and/or the cache 124 may not be integrated with the browser 120, but may instead be separate applications or components, such as browser add-in or extension. For example, a conventional browser may realize the benefits of the bundling technology described herein through the use of an add-in or extension. The add-in or extension may provide functionality to receive bundles from an intermediary system 104 and pre-populate a local browser cache associated with the browser such that the bundles items are in the cache when the browser is ready for them. In some embodiments, applications other than a browser 120 may include or use a bundle manager 122 or some similar module to manage receipt of bundles and extraction of items from the bundles. For example, content aggregators or other specialized content display applications for mobile devices (e.g., Flipboard) may utilize a bundle manager 122.

The intermediary system 104 can be a computing system configured to retrieve content on behalf of the client device 102 (and any number of other client devices). For example, the intermediary system 104 can be a server or group of servers that may be accessed via the network 110. In some embodiments, the intermediary system 104 may be a proxy server, a system operated by an internet service provider (ISP), or some other device or group of devices that retrieve content on behalf of client devices 102. In additional embodiments, the intermediary system 104 provides content processing functionality, such as some or all of the content processing functionality typically performed by browser application executing on a client device. For example, the intermediary system 104 may obtain requested content from a content server 106, obtain additional items (e.g., images and executable code files) referenced by the requested content, execute code (e.g., JavaScript) that may be included in the content, render the content for display, and transmit the pre-rendered, pre-executed content item to the client device. By performing some or all of these and other operations at the intermediary system 104, the substantial computing resources and high-speed network connections typically available to network-based server systems may be leveraged to perform the operations much more quickly than would otherwise be possible on a client computing device 102 with comparatively limited processing capability. One example of an intermediary system that provides remote content processing functionality is disclosed in commonly-owned U.S. Pat. No. 8,577,963, issued on Nov. 5, 2013 and entitled "REMOTE BROWSING SESSION BETWEEN CLIENT BROWSER AND NETWORK BASED BROWSER," which is hereby incorporated by reference in its entirety.

The intermediary system 104 can include various components, such as a bundle building module 140 to generate bundles of referenced content items, a bundle streaming module 142 to provide the bundles to client devices 102, a content retrieval module 144 to obtain content on behalf of client devices 102, and a cache 146 to store the generated bundles and previously retrieved content. In some embodiments, the intermediary system 104 may include additional or fewer components than those shown in FIG. 1. For example, the intermediary system may have a single module or component that performs the tasks of building and streaming the bundles 140, 142. As another example, the intermediary system 104 may have a data store for storing bundles separate from the cache 146 for previously retrieved items.

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of intermediary system 104 can be combined on one server computing device or separated individually or into groups on several server computing devices.

The content servers 106 can correspond to logical associations of one or more computing devices for hosting content and servicing requests for the hosted content over the network 110. For example, a content server 106 can include a web server component corresponding to one or more server computing devices for obtaining and processing requests for content (such as content pages) from client devices 102, the intermediary system 104, or other devices or service providers. In some embodiments, one or more content servers 106 may be associated with a CDN service provider, an application service provider, etc.

Request Processing and Bundle Delivery

Figure 2:
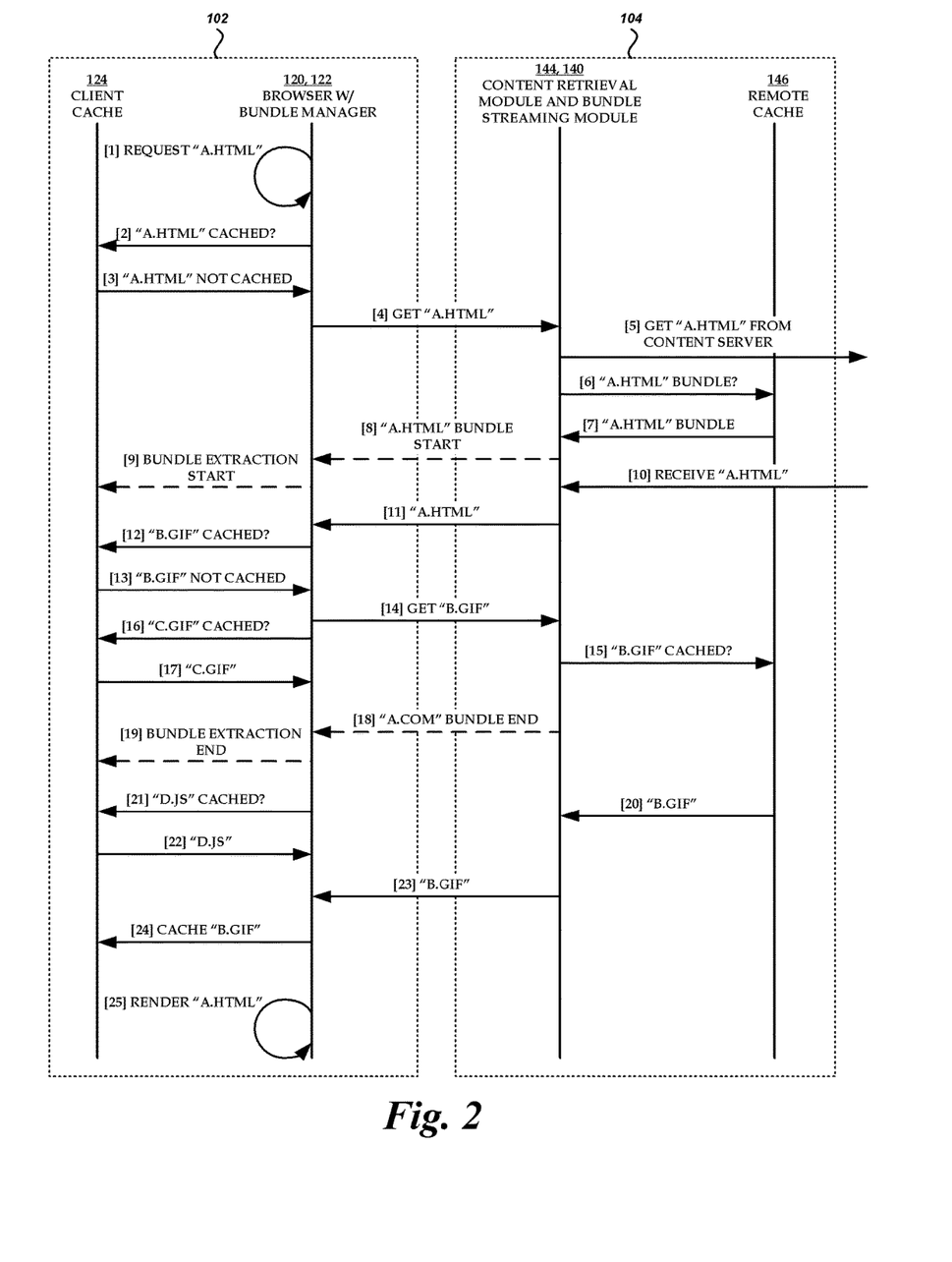
FIG. 2 is a diagram of illustrative network communications during the process of requesting and retrieving a content item associated with a bundle of referenced items.

FIG. 2 illustrates example interactions between a client device 102 and an intermediary system 104 to implement features for processing content requests and proactively providing bundles of referenced content items. The interactions within the client device 102 are shown for convenience as occurring between a combined browser 120/bundle manager 122 and a separate cache 124. In some embodiments, the bundle manager 122 and cache 124 may both be integrated into the browser 122, or the bundle manager 122 and cache 124 may both be separated from the browser 120 and/or each other. Similarly, the interactions within the intermediary system 104 are shown for convenience as occurring between a combined content retrieval module 144/bundle streaming module 140 and a separate cache 146. In some embodiments, the bundle streaming module 140 and cache 146 may both be integrated into the content retrieval module 144, or the bundle streaming module 140 and cache 146 may both be separated from the content retrieval module 144 and/or each other.

As shown in FIG. 2, a browser 120 may receive a request for a particular content item at [1], such as "a.html." For example, a user may type a uniform resource locator (URL) into the browser 120, click a link, activate a bookmark, etc. At [2], the browser 120 may check the client cache 124 to determine whether the requested content item is already present on the client device 102. If the requested content item were present, the browser 120 would load the item from the cache 124 and begin processing it to determine whether any additional content items were referenced. However, in the present example, the browser 120 is notified or otherwise determines at [3] that "a.html" is not present in the client cache 124. The browser 120 then requests "a.html" from the intermediary system 104 at [4]. In order to do so, the browser 120 can establish a connection with the intermediary system 104, such as an HTTP connection. In some embodiments, the browser 120 may establish a connection according to some bi-directional communication protocol, such as SPDY. Advantageously, establishing a connection using SPDY or some other bi-directional communication protocol allows data transmissions to be initiated from either the client device 102 or from the intermediary system 104 (e.g., the intermediary system 104 may transmit data to the client device 102 that was not requested, such as a bundle of content items referenced by the requested content item—"a.html" in this example). Such communication is different than HTTP, in which all data transmissions much be initiated by the client device 102 (e.g., all data transmitted to the client device 102 must first be requested by the client device 102).

The content retrieval module 144 of the intermediary system 104 can retrieve the requested content item from a corresponding content server 106 at [5]. In parallel with retrieval of the requested content item, the bundle streaming module 142 (or some other module or component of the intermediary system 104) can check the cache 146 at [6] to determine whether a bundle of content items referenced by "a.html" has been created. If, as in the present example, a bundle has been created, the bundle streaming module 142 can access the bundle at [7] and begin streaming the bundle to the client device 102 at [8].

In some embodiments, the bundle may not be in the remote cache 146, but may instead be stored in some other location. Rather than checking the remote cache 146, the bundle streaming module 142 may access the other location or may query some other data source to determine whether a bundle for the requested content item exists. For example, the bundle streaming module 142 may query a provider of bundles to determine whether bundle exists. In some embodiments, as described in greater detail below, the intermediary system 104 may have access to information about which bundles and/or individual referenced content items are present at the client device 102 (e.g., are in the client cache 124). In such cases, the bundle streaming module 142 can determine which version of the bundle to send, which individual items to send, etc.

Upon receipt of the bundle by the browser 120, the bundle manager 122 (or some other module or component) can begin extracting individual items from the bundle at [9]. The bundle manager 122 may store the individual content items in the client cache 124 in order to pre-populate the cache. In such cases, the processing performed by the browser 120 to access the items in the bundle does not need to be changed; rather, the browser 120 will be able to retrieve the referenced content items from the cache 124 using standard cache query techniques known in the art. As a result, current versions of referenced content items may be obtained from a client cache 124 during normal processing of a requested content item, even if the requested content item had never been accessed before by the client device, or even if only stale or expired versions of the referenced content items were present in the cache when the client device initiated the request for the requested content item.

At [10], the content retrieval module 144 may obtain the requested content item—"a.html" in this example—from a content server 106. The content retrieval module 144 may then provide the requested content item to the client device 102 at [11]. The exact sequence in which the requested content item is requested, obtained, and provided to the client device 102 by the intermediary system 104, and in which the bundle associated with the requested content item is obtained and provided to the client computing device 102 by the intermediary system 104, may vary from that illustrated in FIG. 2. For example, the bundle may be obtained and provided to the client device 102 in parallel with requesting and obtaining the requested content item from a content server 106. As another example, the requested content item may be requested from the content server 106 on behalf of the client device 102 prior to or subsequent to initiating transmission of the bundle to the client device 102. As a further example, the sequence of requests and transmissions may vary from one request to the next, based on current network conditions, server load, or any number of other factors.

Upon receipt of the requested content item by the client device 102, the browser 120 can parse or otherwise process the content item and determine whether any additional content items are referenced. Illustratively, the requested content item in the current example may reference two image files ("b.gif" and "c.gif") and a script file ("d.js"). The browser 120 may begin checking the client cache 124 for the referenced items at [12]. One image file—"b.gif"—may not have been included in the bundle for a variety of reasons, such as being labeled by the origin server as non-cacheable, being customized for the specific user, not being sufficiently static over time, etc. As a result, the browser 120 may be notified or otherwise determine at [13] that "b.gif" is not cached. The browser 120 may then request the referenced content item from the intermediary system 104 at [14].

The intermediary system 104 may check the remote cache 146 at [15] for the referenced content item, eventually determining that the item is in the cache 146 at [20] and providing the item to the client device 102 at [23].

The browser 120 may proceed to check the local client cache 124 for additional referenced content items at [16]. Illustratively, one of the referenced files—"c.gif"—may have been in the bundle and may have been extracted and placed in the client cache 124 by the bundle manager 122 even though the bundle may not have been completely received yet by the client device 102. The file may be obtained from the client cache 124 at [17]. Subsequently, receipt of the bundle may be completed at [18], and the bundle manager 122 may finish extraction of the referenced content items within the bundle at [19]. At [21] and [22], the browser 120 may check the cache 124 for and obtain "d.js." Illustratively, "d.js" may have been extracted from the bundle and populated into the cache 124 by the bundle manager 122.

As described above, the browser 120 may receive "b.gif" from the intermediary system 104 at [23]. As shown, multiple items have been received in the bundle, extracted into the local client cache 124, and obtained from the local cache 124 between the request for "b.gif" at [14] and the receipt of "b.gif" at [23]. The browser 120 can cache "b.gif" at [24]. The browser 124 can proceed to render the requested and referenced content items at [25].

Generation of Content Bundles

Figure 3:
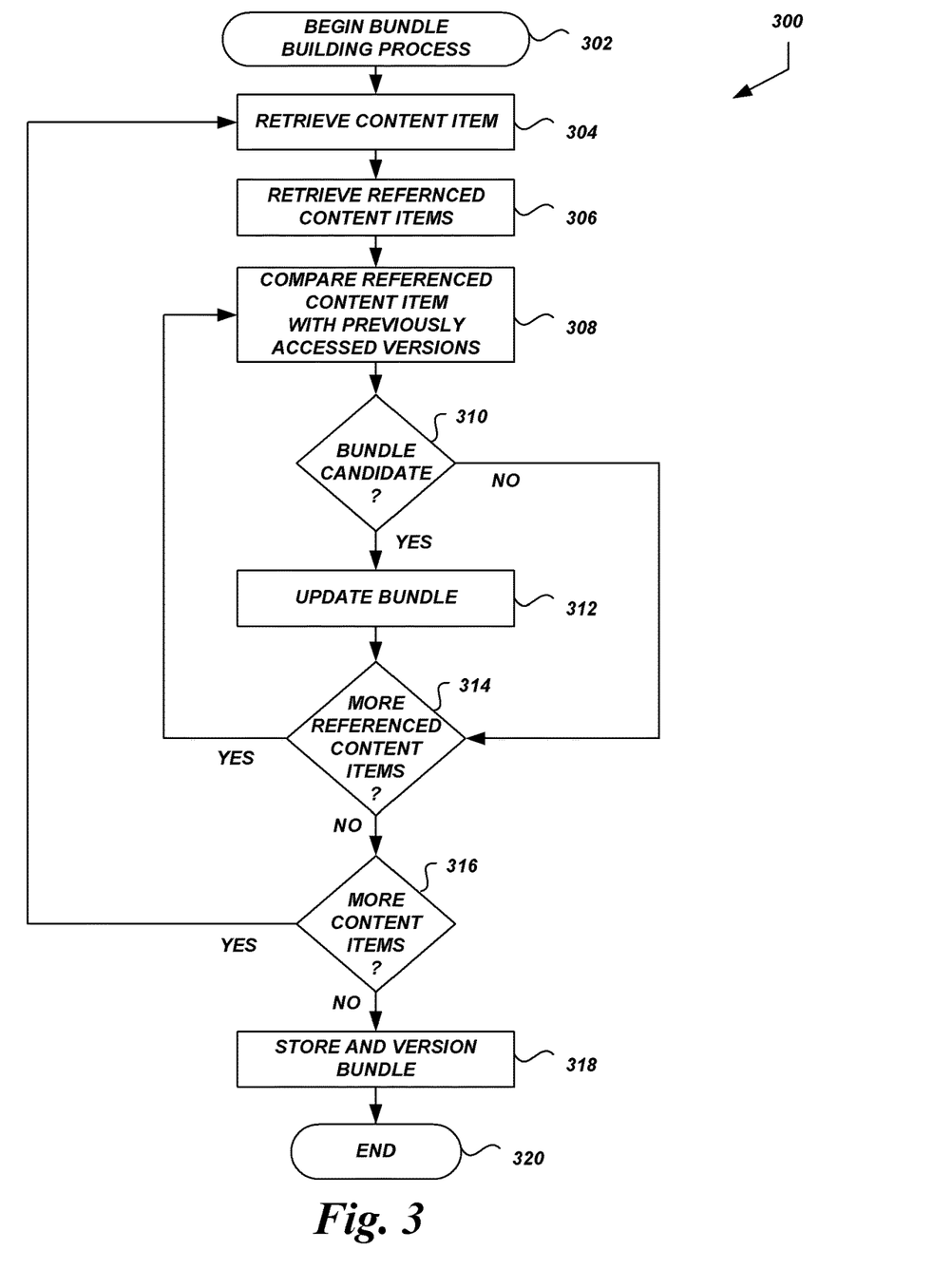
FIG. 3 is a flow diagram of an illustrative process for bundling content items.

FIG. 3 illustrates a sample process 300 for generating bundles of referenced content items to be provided to client devices. Advantageously, an intermediary system 104 may perform the process 300 to generate content bundles to be provided for use by any client device requesting a particular content item. In some embodiments, an intermediary system 104 may perform the process 300 to generate content bundles for an entire domain (or some portion thereof) rather than a particular content item. In additional embodiments, an intermediary system 104 may perform the process 300 to generate content bundles for content items expected to be requested by a particular user or group of users.

The process 300 begins at block 302. The bundle building module 140 or some other module or component performing the process 300 can determine the content item, domain, and/or user for which to generate a content bundle. For example, the bundle building module 140 may be invoked to generate content bundles for the most popular content items requested from the intermediary system 104 by all users, or some group of users, over some period of time. As another example, the bundle building module 140 may be invoked to generate content bundles for the content items or domains most likely to be requested by a particular user or group of users.

At block 304, the bundle building module 140 or some other module or component performing the process 300 can retrieve a content item from a content server 106. For example, prior to the series of communications and actions illustrated in FIG. 2, the bundle building module 140 may perform the process 300 and access "a.html" from a particular content server 106.

At block 306, the bundle building module 140 can process the retrieved content item and determine whether there are any additional content items referenced by the retrieved content item. In the present example, "a.html" references "b.gif," "c.gif" and "d.js," and the bundle building module 140 can retrieve the newest version of those referenced items from the appropriate content server 106. Illustratively, one or more of the referenced content items may be hosted by or otherwise retrieved from a different domain or content server 106 than the content item for which the bundle is being built.

At block 308, the bundle building module 140 can compare the newest version of a referenced content item with one or more previously retrieved versions of the same content item in order to determine whether the newest version is different. For example, the bundle building module 140 may apply a checksum or digest function, such as a hashing algorithm, to each version of the content item. A hash is a fixed-size data value that may be computed from input data of an arbitrary length. Hashes computed from two identical inputs will be identical, but there is an extremely high probability that hashes computed from two different inputs will be different. The hashes for the various versions of the content item can be compared in order to determine the stability of content item, such as whether the item has changed since the previous version, how often the content item changes over time, etc.

At decision block 310, the bundle building module 140 can determine whether content item is a candidate for inclusion in a bundle. The determination may be based on the stability of the content item determined above, whether the content item includes a caching directive, etc. If the item is cacheable (e.g., the content item does not include a header indicating the item is not to be cached), then the content item may be a candidate for inclusion in the bundle. In some embodiments, the "cache-ability" of an item may be different if the item is being included in a bundle than it would be for an item being cached at a proxy server in a conventional manner. For example, if a personal bundle is being built or updated, items normally cacheable at a client device may be included in the bundle, even if those items are not normally cacheable at a server. In addition, if the content item has changed since the previously retrieved version, then the item may also be a candidate for inclusion in the bundle, such as when several versions of a bundle are maintained or if a single update-to-date version of the bundle is maintained. If the content item has not changed in the time since a previously accessed version was included in a bundle, the content item may not be a candidate for inclusion in the bundle currently being generated. For example, if several versions of a bundle are maintained by the intermediary system 104, then only those content items that have changed from a previous version may be included in an incremental version of the bundle.

If the bundle building module 140 determines at decision block 310 that the current version of the content item is a bundle candidate, the process 300 may proceed to block 312, where the bundle may be updated with the current version. Otherwise, the process 300 may proceed to decision block 314. In the example illustrated in FIG. 2, "b.gif" may have been marked as not cacheable by the content server 106, and therefore "b.gif" was not a candidate for inclusion in the bundle. The other items—"c.gif" and "d.js"—may have been marked as cacheable and/or may be relatively stable over a period of time. The items may therefore be good candidates for inclusion in the bundle being built. The bundle candidates may be added to an existing bundle, for example if the bundle does not already include the bundle candidates. If there is an older version of a bundle candidate in the bundle, the bundle may be updated by replacing that older version with a newer version. In some embodiments, different versions of the bundle may be generated and managed, as described in detail below.

At decision block 314, the bundle building module 140 can determine whether there are additional referenced content items to analyze for potential inclusion in the bundle. If so, the process returns to block 308. Otherwise, the process 300 proceeds to decision block 316. For example, the process 300 can return to block 308 for each of "c.gif," "d.js," and any other content item referenced by "a.html."

At decision block 316, the bundle building module 140 can determine whether there are additional content items to access for the current bundle. For example, if the current bundle is being built for a domain rather than a single content item, the bundle building module 140 can "crawl" the domain or request the next content item on a list of items to be accessed. As another example, if the current bundle is being built for the most-requested sites by a particular user or group of users, the bundle building module 140 can access the next content item in a list of the most-requested sites. If the bundle building module 140 determines that there are additional content items to obtain, the process 300 can return to block 304. Otherwise, the process can proceed to block 318.

At block 318, the bundle building module 140 can store the bundle such that it may be provided to client devices 102. For example, the bundle building module 140 may store the bundle in the cache 146 or some other data store accessible by the intermediary system 104. In some embodiments, multiple versions of a bundle for a particular content item/domain/user may be kept. For example, a first version may include a copy of every content item referenced by "a.html" that is a bundle candidate, as described above. Subsequently, the process 300 may be repeated (e.g., periodically, such as daily or hourly) in order to retrieve updated versions of referenced content items that may have changed since the first (or most recent) version of the bundle was created. An updated version of the bundle may then be created with only those content items that have changed since the previous version of the bundle was created. In this way, a client device 102 may be provided with a smaller bundle, thereby requiring less transfer time and bandwidth, if the client device 102 has previously received a prior version of the bundle. When a client device 102 subsequently requests the content item for which the bundle was created, the client device 102 may provide data regarding which bundle version was last received by the client device 102. The intermediary system can then determine which version(s) to provide the client device 102, if any.

In some embodiments, the bundle building module 140 can create multiple versions of a bundle based on relative importance of the various referenced content items. Bundles with more important or higher priority items can them be provided first or otherwise be given transmission priority over bundles with less important items. For example, a first script file may include code to be executed during rendering of a particular web page, while a second script file may include code that is not executed until a user initiates some process after rendering. The first script file may be given higher priority therefore placed in a higher priority bundle (or placed such that it will be transmitted before the second script file if using a single bundle). As another example, a second image file may not be shown until a user "mouses over" a first image file. In this case, the first image file may be given priority over the second image file, similar to the script file example described above.

At block 320, the process 300 terminates.

Management of Browsing Sessions

Figure 4:
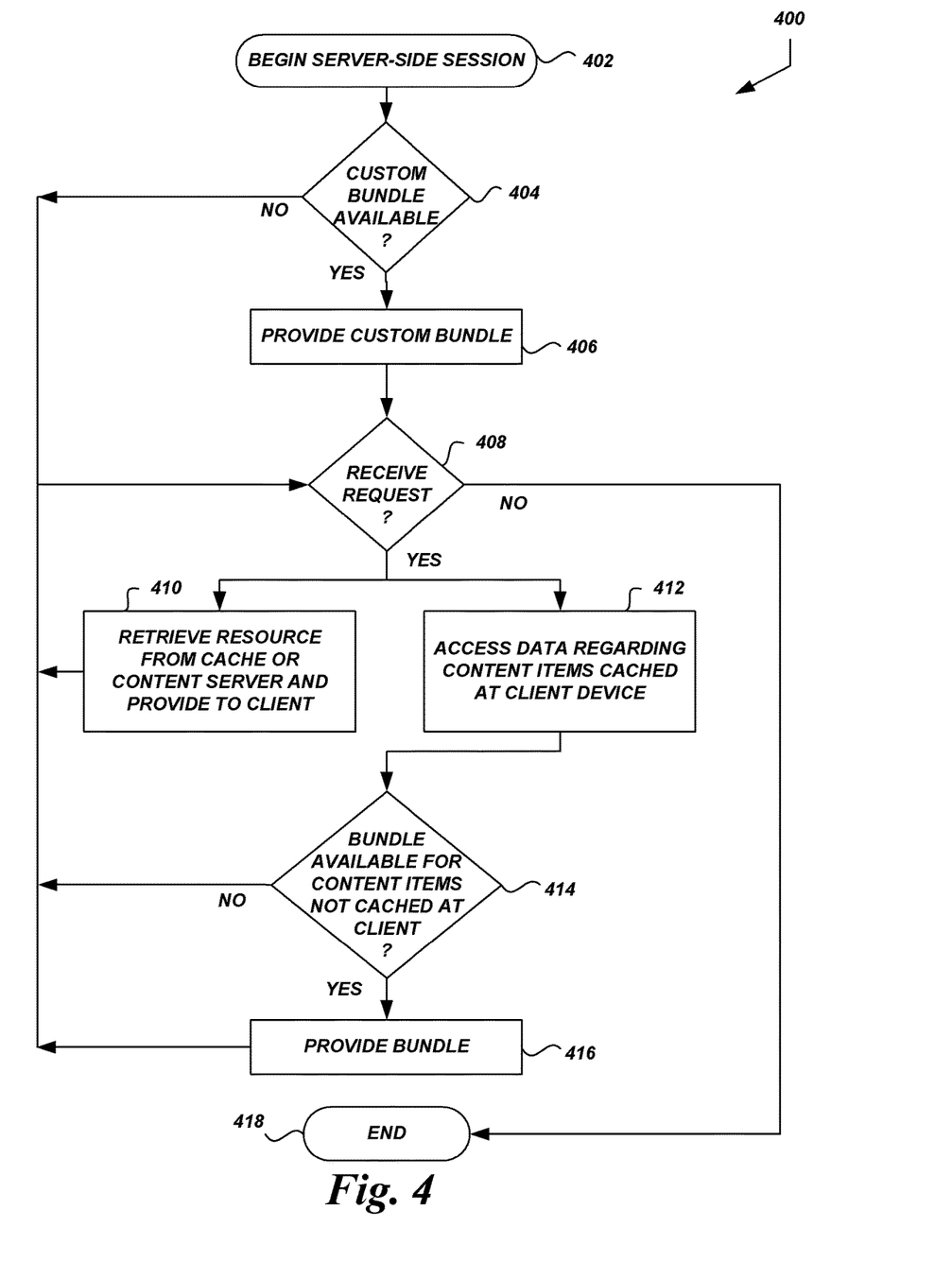
FIG. 4 is a flow diagram of an illustrative process for responding to a request for a content item associated with a bundle.

With reference now to FIG. 4, a process 400 for managing a browsing session at a server system will be described. The process 400 begins at block 402. The process 400 may be executed by an intermediary system in response to establishment of a browser session by a client device 102, or in response to receipt of a content request from a client device 102.

At decision block 404, the bundle streaming module 142 can determine whether a custom bundle is available for the particular user or client device 102 initiating the browsing session. In some embodiments, the client device 102 may provide information regarding which content items are requested most by the client device 102. For example, the client device 102 may include a header in the request with metadata indicating the top 10 or top 100 content items or domains requested by the client device over some period of time. The bundle streaming module 142 may then determine whether a bundle of content items referenced by those particular content items or associated with those domains is available. As another example, the bundle streaming module 142 may determine the identity of the client device 102 or a user thereof, based on identifier included in the request or provided by the client device 102 (e.g., an IP address, MAC address, user name, or some other information). The bundle streaming module 142 may then determine whether a bundle is available for the user or client device 102. If a customized bundle is available, the process 400 may proceed to block 406, where the bundle streaming module 142 provides the bundle (or multiple bundles) to the client device 102. Otherwise, the process 400 proceeds to decision block 408.

At decision block 408, the intermediary system 104 can determine whether a request has been received from the client device 102. If so, the process 400 can proceed to blocks 410 and 412. Otherwise, the process terminates at block 418.

At block 410, the content retrieval module 144 or some other module or component can retrieve the requested content item from cache 146 or from a content server 106, and provide the content item to the client device. In the example illustrated in FIG. 2, the content retrieval module 144 can obtain "a.html" and provide it to the client device 102.

At block 412, the bundle streaming module 142 can access data regarding content items currently at the client device 102. For example, the client device 102 may provide, with a request for a content item, a header or some other metadata regarding which content items were previously cached in connection with the requested content item, which bundles or bundle versions have been previously received in connection with the requested content item, etc. The bundle streaming module 142 may make the determination in block 412 prior to, in parallel with, or subsequent to the content retrieval module 144 processing described above with respect to block 410.

At decision block 414, bundle streaming module 142 can determine whether there is a bundle available for content items not already cached at the client device 102. In some embodiments, the intermediary system 104 may maintain different versions of a bundle based on which referenced content items have changed in the time since a previous version was created. If a client device 102 provides data identifying the latest version of the bundle received by the client device 102, the bundle streaming module 142 can select a newer version, if available. In some embodiments, the client device 102 may provide data identifying the particular referenced content items currently cached at the client device 102. The bundle streaming module 142 may then select or create a bundle with content items not currently cached at the client device 102.

At block 416, the bundle streaming module 142 can provide the bundle identified above to the client device 102. The process 400 may then return to decision block 408.

Figure 5:
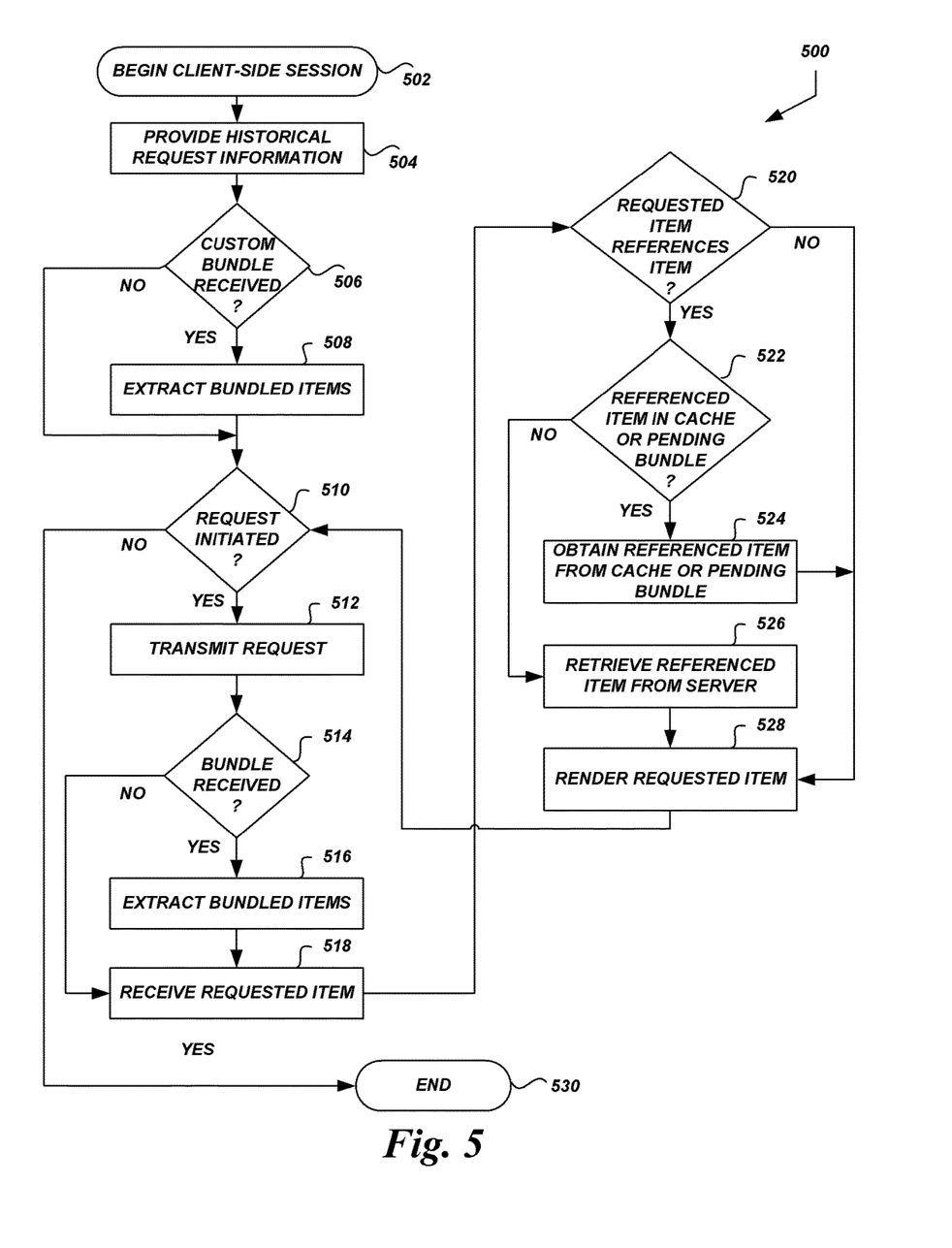
FIG. 5 is a flow diagram of an illustrative process for requesting and obtaining a content item and an associated bundle.

With reference now to FIG. 5, a process 500 for managing a browsing session at a client device 102 will be described. The process 500 may be executed by a browser 120 or some other module or component of a client device 102, such as a browser toolbar or add-in, or a stand-alone application or service. The browser 120 may use the process 500 to obtain and use bundles of content items received from a server system.

The process 500 begins at block 502. The browsing session may begin upon receipt of a content request from a user of the client device 102, such as entry of a URL, activation of a link or bookmark, etc. In some embodiments, the browsing session may begin upon launch of the browser application 120.

At block 504, the browser 120 can provide historical request information to the intermediary system 104. As described above, the historical request information may include a listing of the content items requested most often by the user specifically or client device 102 in general. The browser 120 may provide such information in conjunction with a content request (e.g., in a header), or separate from any content request.

At decision block 506, the bundle manager 122 or some other module or component can determine whether a custom bundle has been received. The custom bundle may have been received responsive to opening a connection (e.g., a connection opened according to some bi-directional communication protocol, such as SPDY), or it may have been received in response to sending a content request to the intermediary system 104, actively requesting the bundle, etc. If a customized bundle is received, the process 500 may proceed to block 508, where the bundle manager 122 can extract content items from the bundle and store them in the cache 124, store the entire bundle in the cache 124, or store the bundle or content items from the bundle in a separate location. If a bundle is not received, the process 500 may proceed to decision block 510.

At decision block 510, the browser 120 can determine whether a request has been initiated at the client device 102. If so, the process 500 may continue to block 512 where the request may be transmitted to an intermediary system 104. In some embodiments, the request may include or otherwise be associated with information regarding which content items have been previously cached in connection with retrieval of the currently requested content item. If no request is initiated, the process 500 may terminate at block 530.

At decision block 514, the client device 102 can determine whether a bundle has been received for the requested content item or domain. If so, the process 500 can proceed to block 516, where the bundle manager 122 can extract the contents of the bundle into the local client cache 124. The bundle may be received from the intermediary system 104 to which the request for the content item (or the base document or file associated with the content item) has been made. The bundle may be received without transmitting a request for the bundle or any item contained therein. For example, the bundle may not be received responsive to a request for the bundle, but may instead be received responsive to the request for the content item. In some embodiments, the bundle may be received from a server or entity separate from the intermediary system 104. For example, the client device 102 may transmit a request for a content item to the intermediary system 104. Responsive to that request, the client device 102 may receive the requested content item (e.g., the base document of the content item) from the intermediary system 104, and the bundle from a separate server (e.g., via a separate connection). In some embodiments, the client device 102 may receive the requested content item (e.g., the base document of the content item) from a content server 106. The client device 102 may also receive the bundle from the intermediary system 104 without making a request for the bundle, or not in response to a request for the bundle (e.g., responsive to the request for the content item instead).

At block 518, the requested content item is received from the intermediary system 104 or from some other source (e.g., the origin content server 106, a CDN, etc.).

At decision block 520, the browser 120 can determine whether the requested item references additional content items. If not, the process 500 can proceed to block 528, where the requested content item is rendered. Otherwise, the process can proceed to decision block 522.

At decision block 522, the bundle manager 122 or browser 120 can determine whether the referenced content item(s) is/are present in the client cache 124. If a referenced content item is not in the cache, it may still be received in the bundle if the bundle download has not yet completed. In such cases, the browser 120 should not request the content item. If the bundle manager 122 or browser 120 determines that the content item is in the cache or in a pending bundle, the process 500 can proceed to block 524 where referenced content item can be obtained from the cache 124. Otherwise, the browser 120 can retrieve the referenced content item from the intermediary system 106 (or some other source) at block 526.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the processes described with respect to FIGS. 3, 4 and 5 may be embodied in a set of executable program instructions stored on one or more non-transitory computer-readable media, such as one or more disk drives or solid-state memory devices, of the client device or a computing system with which the intermediary system is associated. When a process is initiated, the executable program instructions can be loaded into memory, such as RAM, and executed by one or more processors of the client device or computing system. In some embodiments, the computing system may include multiple computing devices, such as servers, and the processes may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    an intermediary system comprising at least one server computing device, the intermediary system configured to operate as an intermediary between client devices and origin content servers, the intermediary system programmed to at least:
        retrieve a plurality of content items referenced by a content page, wherein at least one of the content items is indicated as being popular;
        determine, for each of the retrieved content items, whether the content item is to be included in a bundle cached by the intermediary system, the determination based at least partly on a caching parameter associated with the content items;
        select two or more of the content items determined to be included in a bundle;
        generate the bundle of content items referenced by the content page, the bundle comprising the selected two or more of the plurality of content items; and
        provide respective versions of the bundle to client devices in response to requests for the content page based, at least in part, on information included in the requests indicating a version of the bundle previously received by respective client devices,
        wherein a particular version of the bundle provided in response to a request comprises one or more updated versions of the selected two or more content items as compared with a previously received version indicated in the request,
        wherein the selected two or more content items referenced by the content page are provided to the client devices via a same established network connection, and wherein the bundle is provided independently of requests, by the client devices, for any of the bundled content items referenced by the content page in response to the client devices processing the content page; and
    a browser module that executes on the client devices, the browser module programmed to at least:
        receive the bundle of content items from the intermediary system responsive to a request for the content page, and extract individual content items from the bundle;
        cache the individual content items from the bundle of content items; and
        render the content page using at least a portion of the bundle of content items.

2. The system of claim 1, wherein at least one of the plurality of content items comprises an image file, a script file, or a style sheet.

3. The system of claim 1, wherein at least a portion of the bundle is received by the browser module prior to receipt of the content page.

4. The system of claim 1, wherein at least a portion of the bundle is received by the browser module in parallel with the content page.

5. The system of claim 1, wherein the bundle comprises at least one content item referenced by a second content page, and wherein the browser module has not yet requested the second content page.

6. The system of claim 1, wherein the intermediary system is programmed to select a first content item of the two or more of the plurality of content items based on a comparison with a previously retrieved version of the first content item.

7. The system of claim 1, wherein the intermediary system maintains multiple versions of the bundle associated with the content page, and wherein each version includes particular content items referenced by the content page at a time associated with generation of the version.

8. A computer-implemented method comprising:
    as implemented by a server system comprising an intermediary system configured to operate as an intermediary between client devices and origin content servers,
        retrieving content items referenced by at least one of a plurality of content pages, wherein at least one of the retrieved content items is indicated as being popular;
        generating a bundle of referenced content items, the bundle comprising plurality of content items referenced by a first content page and comprising at least one of the retrieved content items, wherein generating the bundle comprises determining that the plurality of content items are to be included in the bundle based at least partly on a caching parameter associated with the content items;
        receiving, from a client device separate from the server system, a request for the first content page, the request indicating a version of the bundle previously received by the client device; and
        responsive to the request for the first content page, providing, based at least in part on the indicated version, to the client device via a same established network connection:
            the first content page; and
            a particular version of the bundle of referenced content items, wherein the particular version of the bundle comprises one or more updated versions of the plurality of content items in the bundle as compared with the version of the bundle indicated in the request, wherein the bundle is provided independently of a request for any of the bundled content items referenced in the first content page in response to the client device processing the first content page,
        wherein the client device executes a browser configured to extract individual content items from the particular version of the bundle, and render the first content page using at least a portion of the extracted content items.

9. The computer-implemented method of claim 8, wherein the first content page comprise a base document of a content page.

10. The computer-implemented method of claim 8, wherein the bundle comprises a manifest indicating the plurality of content items included in the bundle.

11. The computer-implemented method of claim 8, wherein the bundle comprises at least one content item referenced by a content page not yet requested by the client device.

12. The computer-implemented method of claim 8, wherein the bundle is provided as a first file and the first content page is provided as a second file.

13. The computer-implemented method of claim 8, wherein the bundle is provided without receiving a request for the bundle, and without receiving a request for any of the plurality of content items referenced by the first content page.

14. The computer-implemented method of claim 8, wherein the bundle is associated with one of a single content item or a single domain.

15. The computer-implemented method of claim 8, wherein the bundle is associated with one of a specific user or group of users.

16. The computer-implemented method of claim 8, further comprising:
 determining individual content items to be included in a particular bundle based at least partly on respective caching parameters; and
 generating the particular bundle using the selected individual content items.

17. The computer-implemented method of claim 8, wherein the server system is configured to not provide the bundle based on the client device previously receiving a current version of the bundle.

18. The computer-implemented method of claim 8, wherein multiple versions of the bundle are maintained, and wherein each version includes particular content items referenced by the first content page at a time associated with generation of the version.

* * * * *